INVENTORS:
TRACY CARRIGAN
HERBERT G HOLMES
CLYDE A. SHOEMAKER

ATTORNEY

May 17, 1949.   T. CARRIGAN ET AL   2,470,090
DEVICE FOR OPTICALLY CHECKING DIRIGIBLE WHEELS
Filed Jan. 5, 1945   11 Sheets-Sheet 6
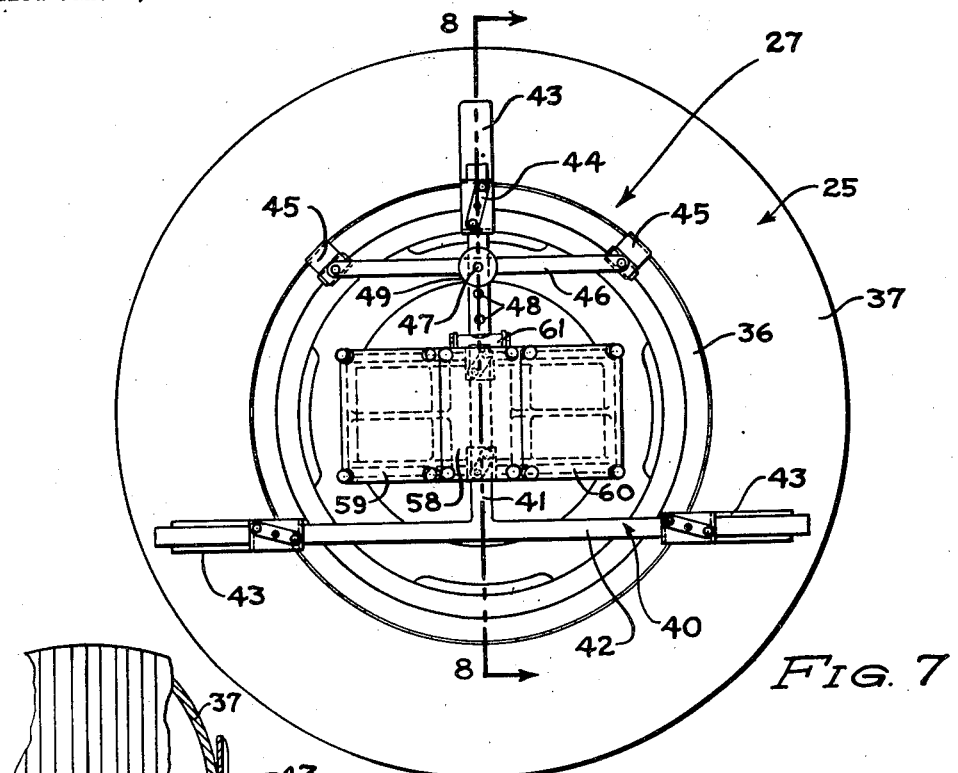
FIG. 7
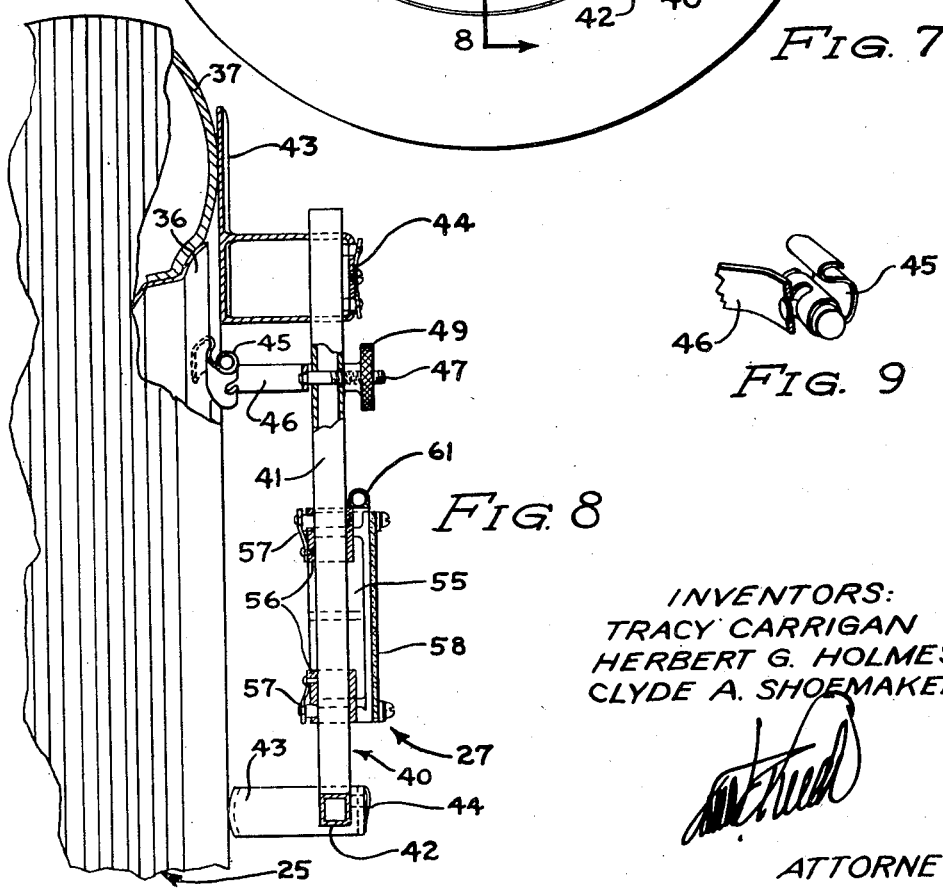
FIG. 8
FIG. 9
INVENTORS:
TRACY CARRIGAN
HERBERT G. HOLMES
CLYDE A. SHOEMAKER
ATTORNEY May 17, 1949.   T. CARRIGAN ET AL   2,470,090
DEVICE FOR OPTICALLY CHECKING DIRIGIBLE WHEELS
Filed Jan. 5, 1945   11 Sheets-Sheet 7
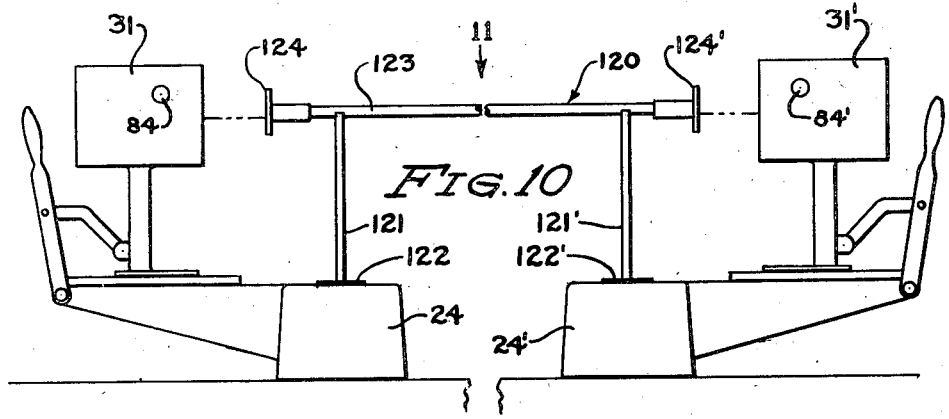
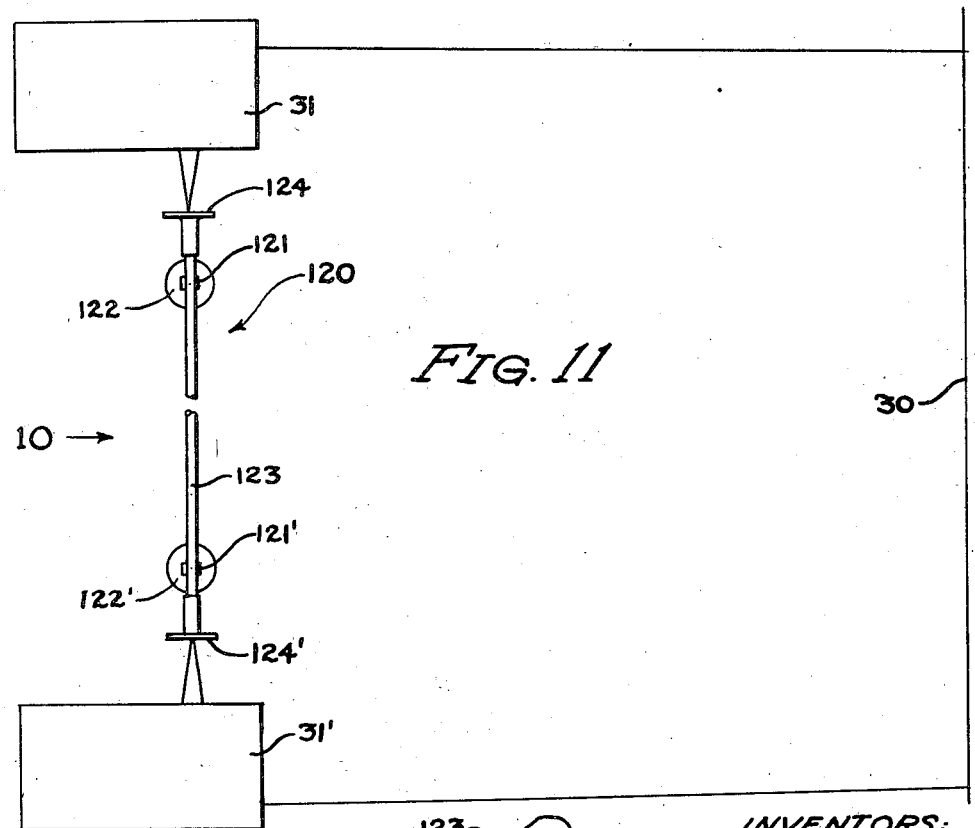
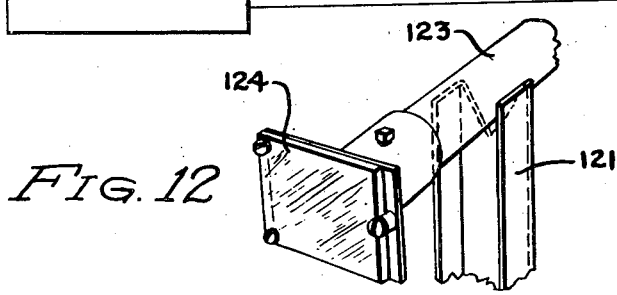
INVENTORS:
TRACY CARRIGAN
HERBERT G. HOLMES
CLYDE A. SHOEMAKER
ATTORNEY May 17, 1949.   T. CARRIGAN ET AL   2,470,090
DEVICE FOR OPTICALLY CHECKING DIRIGIBLE WHEELS
Filed Jan. 5, 1945   11 Sheets—Sheet 11

INVENTORS
TRACY CARRIGAN
HERBERT G. HOLMES
CLYDE A. SHOEMAKER

ATTORNEY

Patented May 17, 1949

2,470,090

UNITED STATES PATENT OFFICE 2,470,090

DEVICE FOR OPTICALLY CHECKING DIRIGIBLE WHEELS

Tracy Carrigan, Herbert G. Holmes, and Clyde A. Shoemaker, Lansing, Mich., assignors to Food Machinery and Chemical Corporation, a corporation of Delaware Application January 5, 1945, Serial No. 571,716

14 Claims. (Cl. 88—14)

1

This invention relates to certain alignment characteristics of dirigible vehicle wheels and particularly to an apparatus for checking these in order to maintain the proper attitude of said wheels in steering.

It is an object of the present invention to provide an improved apparatus for use in checking the alignment characteristics of dirigible wheels; which will be relatively simple; and which may be quickly operated to secure accurate results.

The present invention is an improvement on the device disclosed in the co-pending application of Roland E. Wilson, Serial No. 571,717, filed January 5, 1945, on a "Device for optically measuring alignment characteristics of dirigible wheels."

The Wilson device includes a mirror mounted on a dirigible wheel and employs the image of a light beam projected from the device against said mirror and falling on a screen for the purpose of measuring an alignment characteristic of the wheel.

To function accurately, the Wilson device must be located a predetermined distance from this mirror and is slideable towards and away from the mirror to facilitate its being so adjusted.

It is another object of this invention to provide an optical means for locating a measuring instrument a given distance from a mirror which means is suitable for performing this function in the Wilson device.

The Wilson device employs a screen which is disposed parallel with the direction of movement of the projection unit, the projection axis of the chart has a fixed orientation relative to said direction, and the beam projected against the mirror also has a fixed orientation relative to said direction.

For the purpose of maximum accuracy, Wilson projected his beam against the wheel mirror as nearly as possible along the horizontal line which passes through the centers of the two dirigible wheels of the automobile being tested. He projected his chart along a horizontal axis which intercepted the path of the beam at right angles thereto. He then positioned a vertical semi-transparent mirror to intercept the beam and the chart projection axis at an angle of 45° so that the beam and chart projecting rays would have to pass through the semi-transparent mirror on their way to the screen.

By virtue of the fact that the front face of the semi-transparent mirror has high reflecting capacity, as compared to the rear face thereof, the beam reflection from the wheel mirror is reflected

2 by the front face of the semi-transparent mirror onto the screen whereby the image of the beam measures on the chart an alignment characteristic of the wheel.

While Wilson's device operates with a high degree of accuracy, a certain portion of the light employed in projecting the chart and the measuring beam are lost by virtue of these having to pass through the semi-transparent mirror and this consequently prevents attaining the maximum brightness possible in the chart and the measuring image where these appear on the screen.

It is still another object of the present invention to provide a device for optically measuring alignment characteristic of dirigible wheels which employ the general principle of the Wilson device and which operates with a degree of accuracy which is satisfactory commercially without requiring either the measuring light beam or the light of the chart projector to pass through a semi-transparent mirror.

A further object of the invention is to provide a device for locating a measuring instrument a given distance from a mirror by a pair of converging light beams directed against said mirror.

A yet further object of the invention is to provide such a device as aforesaid, for association with a measuring instrument operating according to the Wilson principle in which one of the light beams employed for locating the measuring instrument a given distance from said mirror is the light beam utilized by said instrument in measuring an alignment characteristic of the wheel supporting said mirror.

The manner of accomplishing the foregoing objects as well as further objects and advantages will be made manifest in the following description taken in connection with the accompanying drawings in which:

Fig. 7 is a side elevational view of the left front wheel of a car being tested with said apparatus and illustrating the wheel mirror unit as mounted on said wheel when checking the latter.

Fig. 8 is an enlarged vertical sectional view taken on the line 8—8 of Fig. 7.

Fig. 9 is a detailed fragmentary perspective view of one of the rim clips employed for holding the wheel mirror unit in place.

Fig. 10 is an end elevational view of the apparatus shown in Fig. 1 associated with means for properly installing the same on a testing floor.

Fig. 11 is a plan view of Fig. 10.

Fig. 12 is an enlarged detailed perspective view of part of the installing apparatus shown in Fig. 10.

Figure 1:
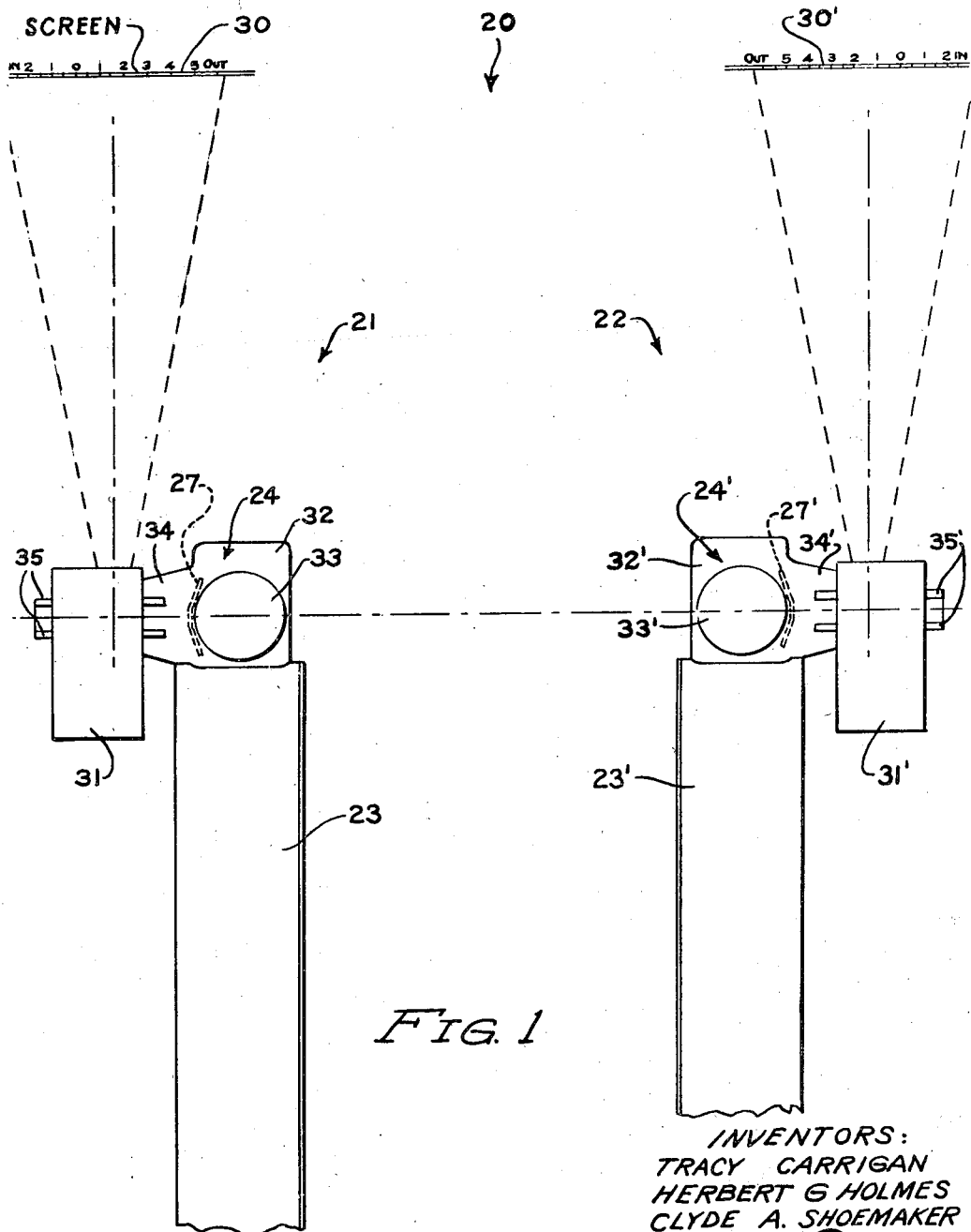
Fig. 1 is a diagrammatic plan view of a preferred embodiment of the apparatus of the invention installed ready for use.
Figure 2:
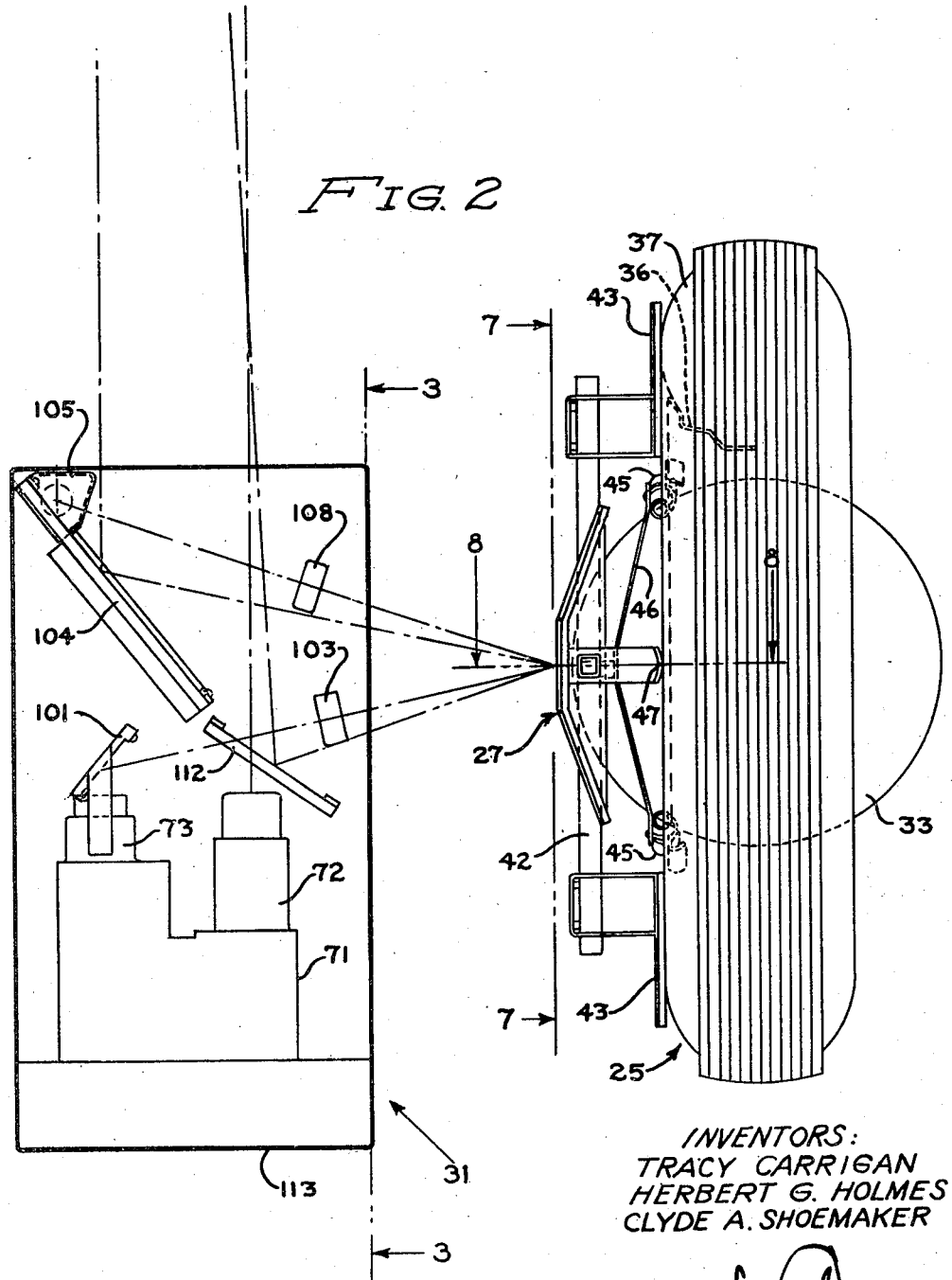
Fig. 2 is an enlarged diagrammatic plan view of the left hand half of said apparatus.

The preferred embodiment of the apparatus shown in the drawings is indicated by the numeral 20 and includes two apparatus sections, a left hand section 21 and a right hand section 22 which are reverse duplicates of each other so that a detailed disclosure and description of one will suffice for both. Only the left hand section is thus disclosed and described. Reference to parts of the right hand apparatus section 22 will, therefore, be by using the reference numerals of corresponding parts in the left hand section 21 with prime attached.

The two apparatus sections 21 and 22 are mounted on a testing floor in parallelism as shown in plan in Fig. 1 so that the car to be tested can be driven onto the apparatus for testing the alignment characteristics of the front wheels thereof.

The left hand apparatus section 21 includes a track 23 over which the wheels on the left side of an automobile ride when the latter is driven into position for testing, a turn table 24 on which the left front wheel 25 of an automobile 26 (Figs. 14, 15 and 16) rests when said automobile is in position for testing and a wheel mirror unit 27 which is adapted to be fastened onto said wheel 25. Apparatus section 21 also includes a screen 30 which is adapted to be set up in a substantially vertical position at right angles to the longitudinal axis of the automobile 26 and spaced forwardly about 72 inches from the axis of the wheel 25 when said wheel is aligned for traveling straight ahead.

Provided on the turn table 24 and spaced laterally from the wheel mirror unit 27 is an optical unit 31. This unit optically projects one or more charts on the screen 30 and also directs beams of light against the mirror unit 27 and then directs the reflections of these beams onto the screen 30 so that these may be employed in connection with one or another of the charts projected thereon for indicating various alignment characteristics of the wheel 25. The apparatus sections 21 and 22 also may be used jointly in this general manner to indicate alignment characteristics found in the relative attitudes of the left front wheel 25 and the right front wheel 25' of the automobile 26 such as toe-in or toe-out.

The turn table 24 has a base 32 on which a turn table plate 33 is freely rotatable about a vertical axis. The base 32 has a lateral extension 34 on which are provided guide rails 35, the purpose of which will be described hereinafter.

The wheel 25 on which the wheel mirror unit 27 operates has a rim 36 and a tire 37. The mirror unit 27 has an inverted T-shaped frame 40, the stem 41 of which is disposed vertically and the cross bar 42 of which is secured to the lower end of the stem 41 and is disposed horizontally when the unit 27 is installed. The T frame 40 is positioned parallel with the plane of the wheel 25 by tire contacting fingers 43 which are slideably mounted on the T frame 40 adjacent the extremities of the stem 41 and cross bar 42 thereof. Each finger 43 has a spring detent device 44 (Fig. 8) which keeps this finger parallel with the frame 40 and prevents its sliding thereon accidentally.

The wheel mirror unit 27 is supported by two rim clips 45 which are pivotally connected to opposite ends of a metal strap 46, a central bolt 47 of which extends through one of several holes 48 provided on the frame stem 41, after which a thumb nut 49 is screwed on said bolt to secure the T frame 40 to the supporting strap 46.

Mounted on the vertical frame stem 41 is a mirror mounting 55 having slide collars 56, which fit the stem 41, and detent devices 57 which prevent play of the mirror mounting 55 on the stem 41 and hold it in any vertical position on this stem to which it is manually moved. The mounting 55 constitutes a base on which are provided a middle mirror 58 and two wing mirrors 59 and 60. Fixed on the upper edge of the mounting 55 is a spirit level 61. When the mirror unit 27 is attached to the wheel 25, the middle mirror 58 is positioned parallel with the plane of this wheel, and the wing mirrors 59 and 60 incline rearwardly from side edges of the mirror 58 at angles of 20° relative to the plane of the wheel and symmetrically with respect to the axis of the wheel.

The optical unit 31 is mounted on a platform 62 fixed on the head of a column 63 which rises from a slide base 64 which slideably fits and rests upon the guide rails 35. Straddling the outer end of the base extension 34 is a forked hand lever 65 which is connected by a link 66 to the column 63 whereby the unit 31 may be shifted towards and away from the wheel 25 by manipulation of the lever 65.

Figure 5:
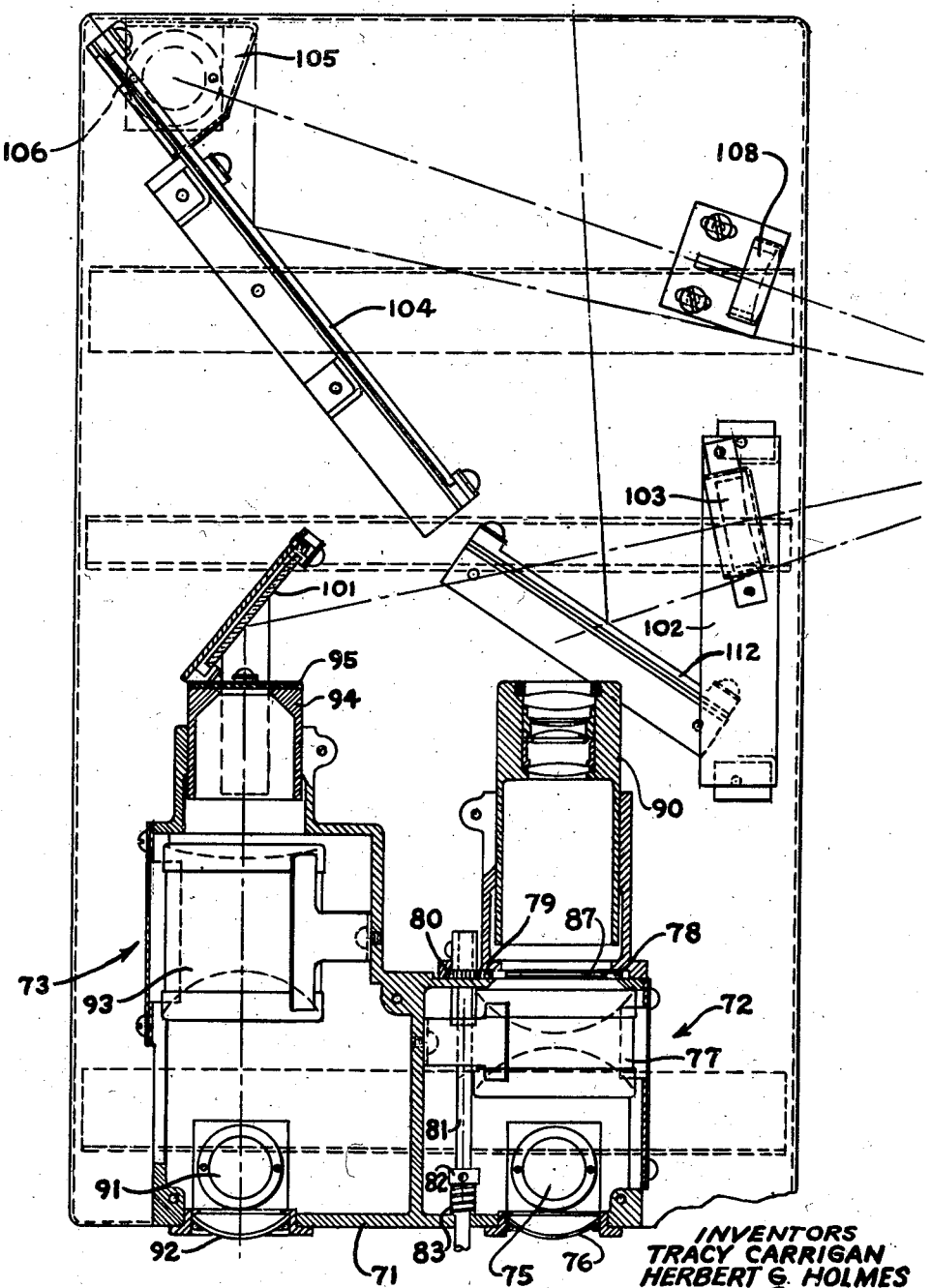
Fig. 5 is a sectional view taken on the line 5—5 of Fig. 3 with the cover shown in the latter removed.
Figure 14:
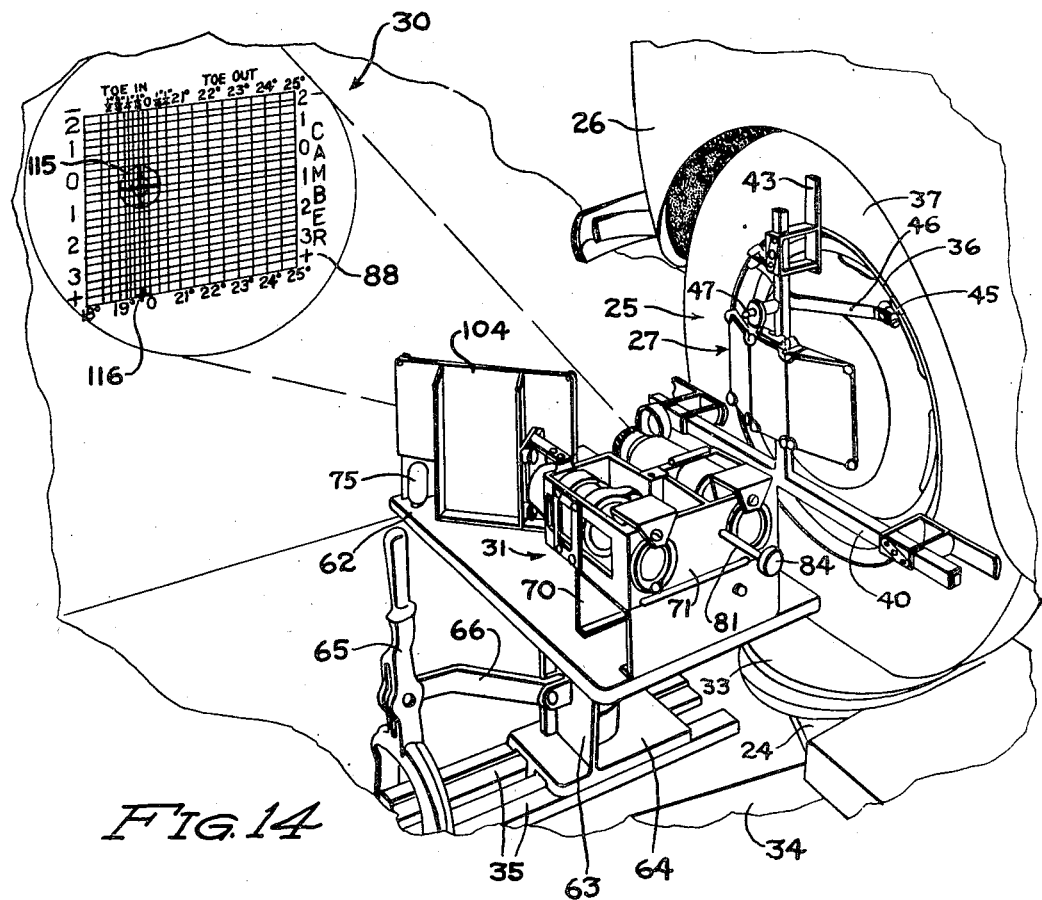
Fig. 14 is a perspective view of the left half of the apparatus of this invention while being employed to check the camber of the left front wheel.

Fixed on the platform 62 adjacent its rear edge is a sheet metal supporting box 70 on which a projector housing 71 is mounted (Fig. 14). This housing is common to a chart projector 72 and a cross-hair indicator beam projector 73 (Fig. 5).

The chart projector 72 is conventional and includes a "T-8" lamp 75, a concave reflector 76, a standard condenser assembly 77, a sliding film holder 78 having a rack 79 along one side thereof with which a pinion 80 on a shaft 81 meshes so that by rotation of this shaft, film holder 78 may be slid up and down in the housing 71.

The shaft 81 has a collar 82 and spring 83 which frictionally retains shaft 81 in any adjusted position so that the film holder 78 remains in any level to which it is adjusted by rotation of the shaft 81. A knob 84 (Fig. 14) is provided on the shaft 81 for manually rotating this.

Figure 15:
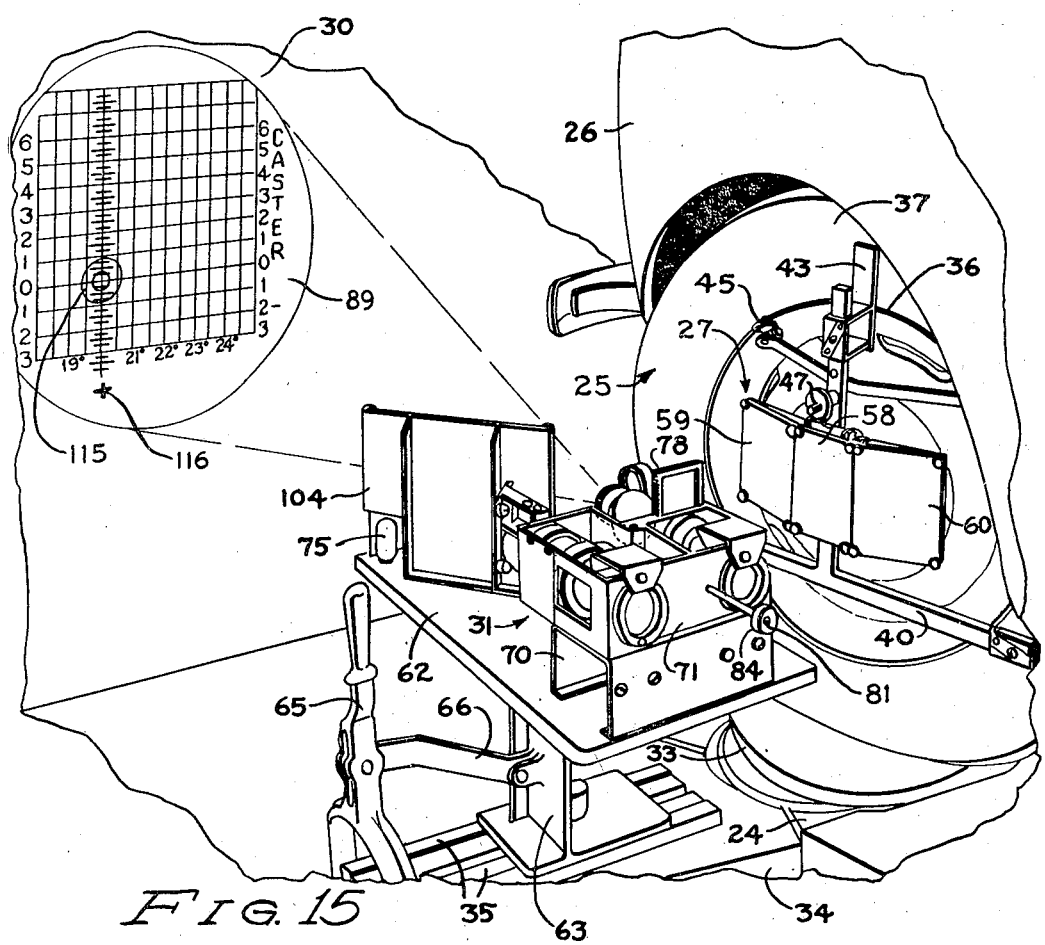
Fig. 15 is a perspective view illustrating the first step in employing the invention to check the caster of the left front wheel.
Figure 16:
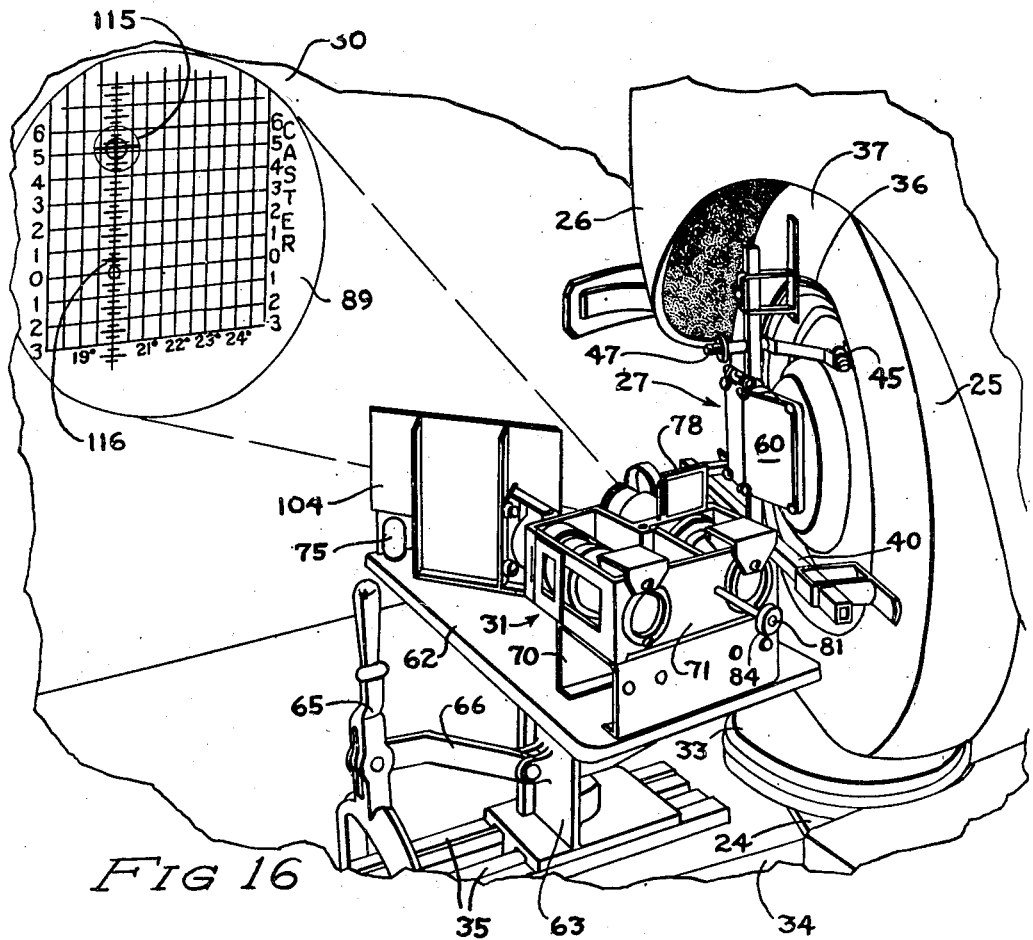
Fig. 16 is a view similar to Fig. 15 but illustrating the second step in employing the invention to check the caster of the left front wheel.

The film holder 78 is provided with a film 87 which has two chart designs thereon one above the other, the upper design being for a camber chart 88 which is shown projected on the screen 30 in Fig. 14, and the lower design being for a caster chart 89 which is shown projected on the screen in Figs. 15 and 16.

Slideable in the housing in front of the film holder 78 is a projector lens assembly 90. Focusing of the image cast by the projector 72 on the screen 30 is effected by longitudinally shifting the projector lens assembly 90.

The cross hair indicator beam projector 73 has a "T-8" lamp 91 (Fig. 5), a concave reflector 92, a relatively long-focus condenser assembly 93, and a cross hair film holder 94 which is slideable in the housing 71 for focusing and orienting the cross hair image on the screen. Slideably mounted in the holder 94 so as to cover the light opening in the holder 94 is a cross hair film 95.

Figure 6:
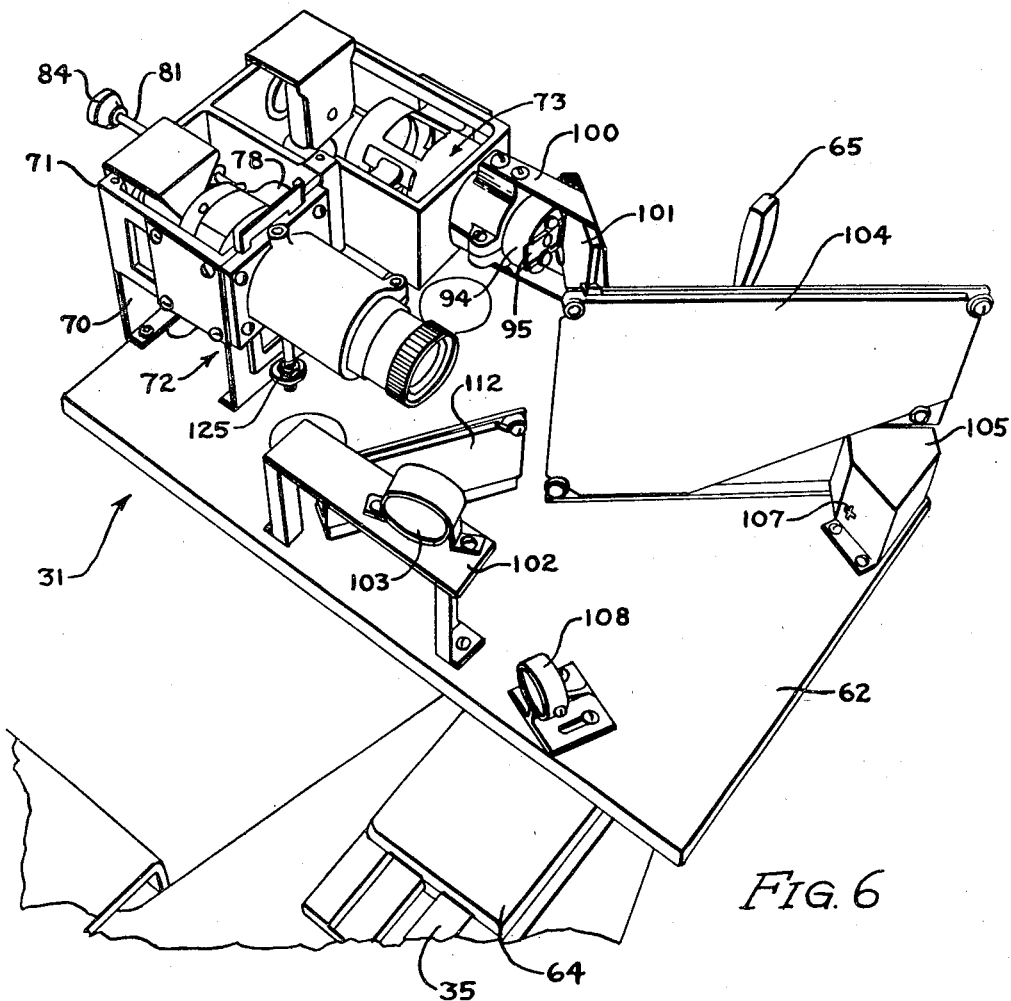
Fig. 6 is a perspective view of the left hand optical unit of said apparatus with the cover removed.

Mounted on arms 100 (Fig. 6), provided on the housing 71, is a cross hair mirror 101 which is angled to intercept the beam of light projected through the cross hair film 95 and reflect this beam into contact with one of the mirrors on the wheel mirror unit 27. Fixed on a bracket 102 provided on the platform 62 is a cross hair projector lens 103 through which the cross hair beam passes on its way to contact one of the wheel mirrors.

Also mounted on the platform 62 is a relatively large front mirror 104, the lower front corner of which is cut away to accommodate a light box 105. The mirror 104 is located in the path of the cross hair beam after this is reflected from one of the wheel mirrors and lies at such an angle as to reflect the reflected cross hair beam onto the screen 30.

The light box 105 contains a lamp 106 (Figs. 5 and 14) and has a light aperture 107 (Fig. 6) formed therein for permitting a locator beam of light from the lamp 106 to escape from the light box. Adjustably fixed on the platform 62 is a lens 108 which is located so that the locator beam passes therethrough and impinges on one of the wheel mirrors. Fixed on the platform 62 is a locator beam mirror 112 which lies in the path of the reflection of the locator beam returning from one of the wheel mirrors and is angled to deflect this deflected locator beam onto the screen 30.

The optical unit 31 is provided with a light sheet metal cover 113 (Fig. 3) having suitable openings through which the shaft 81 and the various light beams may pass. Suitable openings such as the opening 114 permit the ready circulation of air within the unit so as to keep this cool in spite of the heat produced by the three lamps employed therein. Wherever weather conditions require this a suitable blower may be provided for a forced circulation of air through the cover 113.

It is desired to point out here that while the charts 88 and 89 are shown in black on a white background (Figs. 14, 15 and 16), we have found it preferable to have these images appear as white lines on a black background as this makes it much easier to see these images when they are projected on the screen 30 in daylight. It is of special importance that the cross hair beam image 115 be brightly illuminated. To assist in this it has been found preferable to use a simple double convex lens of 9½ inches focal length for the lens 103 which permits a relatively large design for the cross hair to appear on the cross hair film 95. A relatively large amount of light is thus used in forming the cross hair beam. This, of course, tends to give prominence to the cross hair image 115 when this is thrown on the screen 30.

Figure 13:
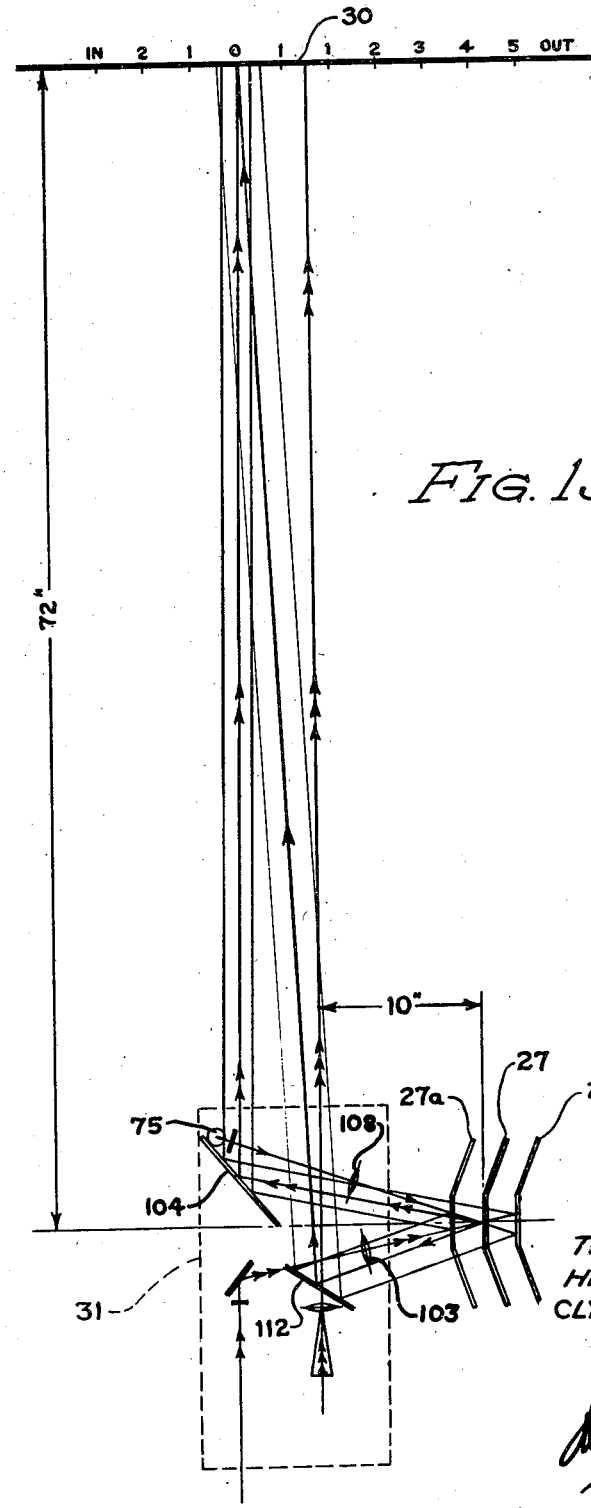
Fig. 13 is a diagrammatic plan view illustrating how the light source unit of the apparatus is properly positioned relative to the wheel mirror unit to bring the images projected from the apparatus into proper relation on the screen.

When installing the apparatus 20 of this invention it has been found advantageous to employ a setting fixture 120, the construction and use of which are illustrated in Figs. 10, 11 and 12. The first step of installation is to mount the tracks 23 and 23', and the turn tables 24 and 24' on the concrete test floor so that these are properly spaced apart for the wheels of an automobile to ride up on the tracks 23 and 23' and each of the front wheels be brought to rest on one of the turn table plates 33 and 33'. In other words, the apparatus sections 21 and 22 are mounted parallel to and directly opposite each other. The screens 30 and 30' are provided with any suitable means of support (not shown) so that these will be located relative to the rest of the apparatus as shown in Figs. 1 and 13.

The fixture 120 includes two standards 121 and 121' having pedestals 122 and 122'. The upper ends of the standards 121 and 121' are notched to receive a pipe 123 having mirrors 124 and 124' at its opposite ends, the reflecting faces of these mirrors being disposed as nearly as possible at right angles to the axis of the pipe 123.

Having installed the tracks 23 and 23', as already described, the turn table plates 33 and 33' are removed and the pedestals 122 and 122' substituted in their place, these pedestals being made to exactly fit the turn table bases 32 and 32'. The pipe 123 is now placed in the notches provided on the standards 121 and 121' (Fig. 10) with mirrors 124 and 124' extending equal distances laterally beyond standards 121 and 121'.

Figure 3:
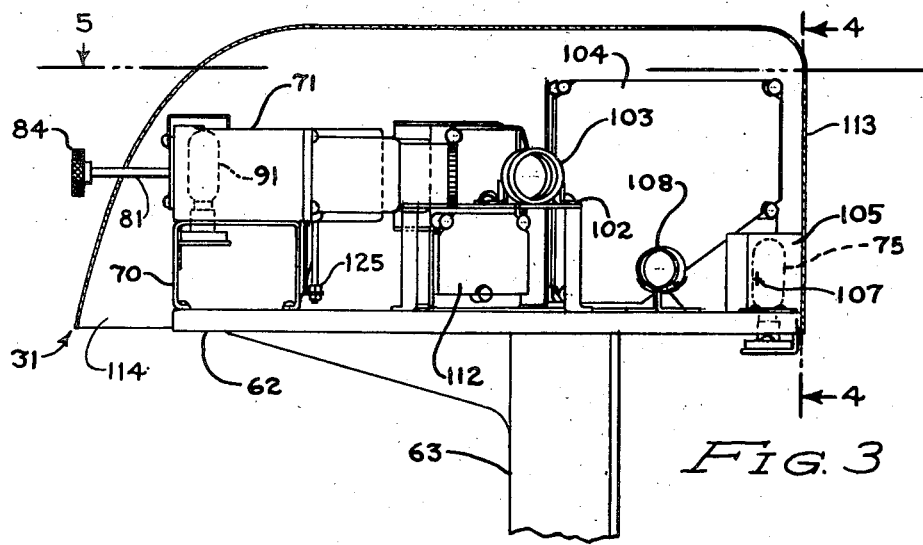
Fig. 3 is a vertical sectional view taken on the line 3—3 of Fig. 2.
Figure 4:
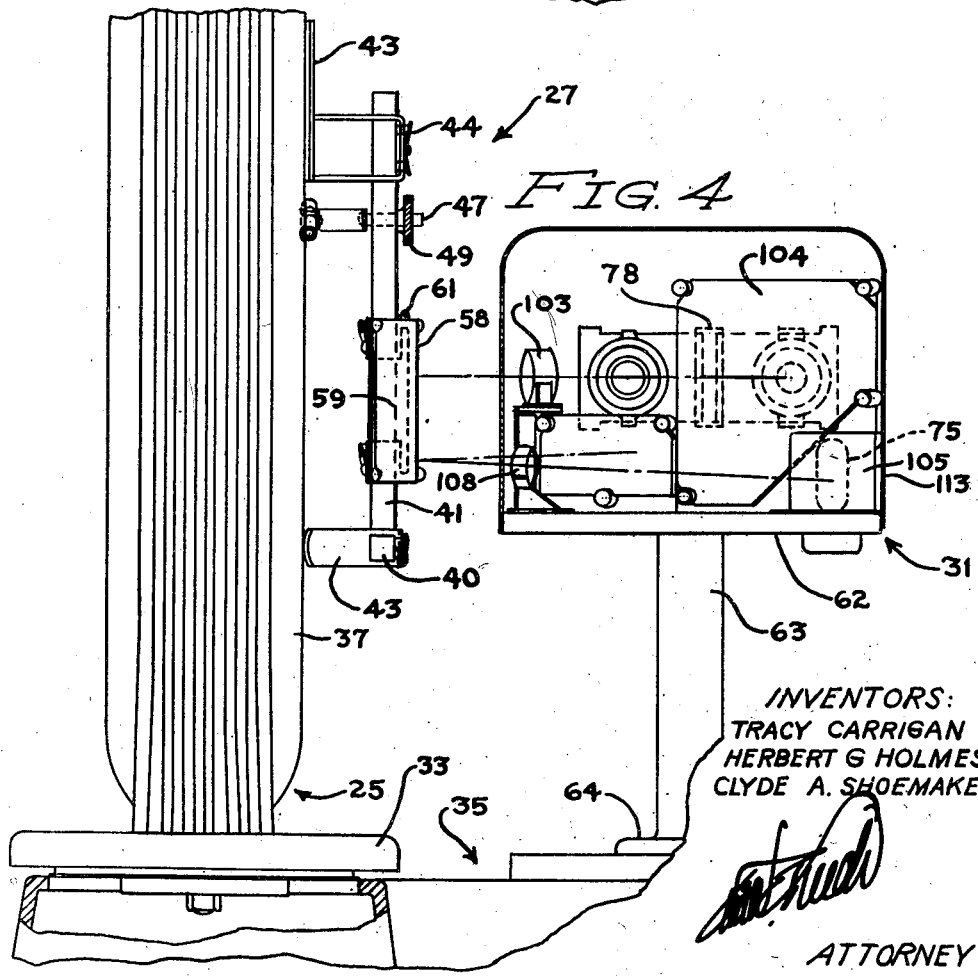
Fig. 4 is a vertical sectional view taken on the line 4—4 of Fig. 3.

To perfect the installation of the optical units 31 and 31', the lamps are now turned on in these and the film holders 78 and 78' adjusted by rotation of the knobs 84 and 84' to move the film holders down to their lowermost positions in which they engage stop nuts 125 and 125' (Fig. 3). These stop nuts are then adjusted so that with the film holders against these nuts, the cross hair images 115 and 115' fall on the respective horizontal "0" lines of charts 88 and 88'.

After being thus adjusted, the optical units 31 and 31' are moved so that the optical axes of the chart projectors 72 and 72' are spaced respectively ten inches from the reflecting faces of the mirrors 124 and 124'.

This may be done by measuring with a rule the distances which the optical units 31 and 31' are spaced from the mirrors 124 and 124'. The apparatus is so designed, however, that these distances may be determined optically. The method of accomplishing this is well illustrated in Fig. 13 in which a wheel mirror unit 27 is shown when properly spaced from the optical unit 31 and in two positions, 27a and 27b, in which, respectively, this wheel mirror unit is placed closer to and further away from the unit 31, than the desired distance.

In this view the axis of the chart projector beam is indicated with triple arrowheads. The path taken by the indicator or cross hair beam is designated by double arrowheads. The path taken by the locator beam is indicated by single arrowheads.

By inspection of Fig. 13 it can readily be seen that when the desired spacing exists between the optical unit 31 and the wheel mirror unit 27 the images 115 and 116 fall on the screen 30 in vertical alignment with each other. In this figure they are shown as in vertical alignment on the line "0". When the distance between these two units is less than the desired ten inches as indicated by the position 27a for the wheel mirror unit 27, it will be noted that the images 115 and 116 are thrown on the screen 30 on opposite sides of the vertical "0" line and out of vertical alignment with each other. When the distance between the optical and wheel mirror units is greater than the desired ten inches, the positions of the cross hair images 115 and 116 on the screen 30 on opposite sides of the vertical line "0" are reversed, the images still being, of course, out of vertical alignment with each other.

This difference in manner of movement of the cross hair image 115 and locator image 116 on the screen 30 results from the indicator beam which produces the cross hair image 115 being projected forwardly and inwardly against the mirror unit 27 while the locator beam causing the locator image 116 on the screen is projected rearwardly and inwardly against the mirror unit 27.

Thus it becomes easy to optically ascertain when the optical unit 31 is properly spaced from the wheel mirror unit 27 and the proper adjustment of optical unit 31' from the wheel mirror unit 27' may be accomplished in exactly the same manner.

As afore noted the camber charts 88 and 88' are now projected in properly adjusted positions on the screens 30 and 30' so that cross hair images 115 and 115' fall on the respective horizontal "0" lines of said charts.

An adjustment of cross hair mirror 101 is now made to insure that the maximum brilliance of the cross hair image 115 on the screen 30 is obtained.

The projected chart images, as well as cross hair images, on the screens 30 and 30' are now focused by making what small adjustments are necessary in the positions of the lenses 103—108 and 103'—108' on the platforms 62 and 62' and the screws by which these elements are mounted are then tightened to hold all said elements together to maintain them in proper adjustment.

With the removal of the fixture 120, and replacing of the turntables 33 and 33', the apparatus 20 is now in readiness for checking the front wheels of any automobile such as the automobile 26 in the following manner.

Operation

The automobile 26 is first driven up onto the apparatus 20 with its front wheels 25 and 25' resting centered respectively on the turn table plates 33 and 33' and with the brakes applied. The wheel mirror assemblies 27 and 27' are now mounted on the front wheels, as already described, with the wheels turned straight ahead. The mirror mounting 55 should be slipped up or down on the mirror unit frame stem 41 to center the mirrors approximately on the center of the wheel.

With the wheels in a straight ahead position the mirror unit 27 should now be rotatably adjusted as necessary by slipping the rim clips 45 to bring the wheel mirrors into horizontal position as indicated by the spirit level 61.

The middle mirror 58 is now facing laterally and substantially parallel with the plane of the wheel. The same adjustment should be repeated on the right hand side of the car 26.

Adjustment is now made of the spacing of the units 31 and 31' from the wheel mirror units 27 and 27' exactly as above described in connection with setting the apparatus. In other words, the cross hair and locator images on each of the screens 30 and 30' are brought into vertical alignment with each other by shifting the optical units 31 and 31' inwardly or outwardly as necessary.

Checking toe-in and toe-out

The wheels 25 and 25' are now turned by the steering mechanism of the automobile 26 so that cross hair beam image 115' falls on the vertical "0" line of the camber chart 88'. By reference now to the projector chart 88 as shown in Fig. 14 the toe-in or toe-out alignment characteristic of the wheels 25 and 25' may be read by the location of the cross hair image 115 on this chart. In this figure a toe-in reading of ⅛ of an inch is indicated.

In adjusting the tie rod of a car to alter the toe-in or toe-out thereof, this invention is particularly advantageous in that this tie rod may be adjusted by the mechanic under the car and the readings on the charts 88 and 88' are visible to the mechanic while doing this job. He is thus able to read on these charts the results of his adjustment so that the latter may be perfected without its being necessary for him to leave the job to make check tests.

Checking camber

In the same setting of the apparatus the camber of the wheel 25 may be read in chart 88 by the distance which the image 115 is located downward or upward on the camber chart 88. This reading in Fig. 14 is plus one half a degree. In a similar manner the camber reading for wheel 25' can be read by the position of the cross hair image 115' on the camber chart 88' on the right hand side of the automobile 26.

Checking steering geometry

To read the steering geometry of the wheels 25 and 25', the operator need not leave the steering wheel but simply turns the wheels 25 and 25' so that the cross hair image of the inside wheel rests on the vertical 20° line of either camber chart or the caster chart of that wheel and then reads the degrees of steering geometry on the corresponding chart of the other wheel as indicated by the position of the cross hair image thereon.

Checking caster

The caster of the wheel 25 is checked entirely independently of the caster of the wheel 25'. These two operations are accomplished in identically the same manner so that a description of one will suffice for both.

To check caster on the left wheel 25, first rotate the knob 81 to elevate the film holding slide 78 until the film 87 is positioned to project the caster image 89 on the screen 30. The wheel 25 is now angled to turn this to the left as shown in Fig. 15 until the cross hair image 115 is located on the vertical 20° line of the chart 89. This indicates that the wheel 25 is turned out exactly 20° from straight ahead and the mirror 59 is now automatically substituted in place of the mirror 58 of the wheel mirror unit 27 for intercepting and reflecting the beams forming the cross hair image 115 and locator image 116. With the cross hair image 115 thus located, the vertical position of the chart 89 is adjusted by manipulation of the knob 81 to cause the cross hair image 115 to fall on the horizontal "0" line of this chart as shown in Fig. 15.

The wheel 25 is now angled inwardly until the image 115 leaves the field of the chart 89, reappears to cross this chart again, and then again reappears on the chart and comes into alignment with the vertical "0" line of chart 89 as shown in Fig. 16. The position of the cross hair image 115 on this line will now indicate the caster in positive or negative degrees. In this figure the reading is plus 5° 6'.

An outstanding advantage of the present invention is the ease and speed with which the preparations for checking a car can be made and accurate checks then obtained. This is made possible by the optical spacing means by which the correct spacing of optical units 31 and 31' from the wheel mirror units 27 and 27' may be quickly attained.

Another advantage is found in the ease of reading the results due to the strong clear images thrown on the screens 30 and 30' because the beams are not forced to pass through any retarding imperfectly transparent body. Sufficient light can thus be transmitted in these beams onto the screens to render reading of the images quite easy, even when operating in daylight.

While only a single embodiment of the invention is disclosed herein, by way of illustration, it is to be understood that various changes may be made in this without departing from the spirit of the invention or the scope of the appended claims.

The claims are:

1. In an apparatus for measuring an alignment characteristic of a dirigible wheel, the combination of: means providing a mirror on said wheel facing laterally therefrom, said mirror having a fixed relationship with the plane of said wheel; a screen for receiving images; primary light source means projecting a beam of light forwardly and inwardly against said mirror; secondary light source means projecting a beam of light rearwardly and inwardly against said mirror; and reflector means lying in the paths of reflection of the aforesaid light beams, said reflector means again reflecting said light beams to cause the latter to project images upon said screen, said light source means and reflector means being mounted for movement as a unit toward and away from said wheel, to cause a variation in the relation of said images on said screen and the attainment of a particular relation between said images when a certain desired spacing of said light source means and reflector means from said wheel has been accomplished.

2. In an apparatus for measuring an alignment characteristic of a dirigible wheel, the combination of: a mirror mounted on said wheel with said mirror facing laterally from said wheel; screen means; means providing a chart on said screen means; optical projector means for projecting a beam of light against said mirror with the reflection of said beam falling on said screen means so as to optically measure on said chart by the position of the image of said beam thereon an alignment characteristic of said wheel, said projector means including means for projecting a locator beam of light against said mirror at a different angle than said first beam and with the reflection of said locator beam falling on said screen means; and means for decreasing and increasing the distance between said optical projection means and said mirror to cause relative movement between the images of said beams on said chart and bring said images into a predetermined relationship indicating a given distance between said mirror and said optical projector means when said screen means is a predetermined distance from said projector means and in the paths of said beams.

3. In an apparatus for measuring an alignment characteristic of a dirigible wheel, the combination of: a mirror mounted on said wheel in a fixed position relative to the plane of said wheel and facing laterally; optical projection means spaced laterally from said mirror; screen means spaced a predetermined distance from said optical projection means, said optical projection means including means for projecting a beam of light forwardly and inwardly against said mirror and a second beam of light rearwardly and inwardly against said mirror and directing said beams after their reflection from said mirror onto said screen means to produce separate images, said projection means also including means for optically projecting a chart onto said screen means; and means for causing relative movement between said projection means and said mirror to adjust their spacing to produce a given relation of said beam images on said chart, said relation indicating the spacing of said projection means a desired distance from said mirror.

4. In an apparatus for measuring an alignment characteristic of a dirigible wheel, the combination of: an optical unit; means for mounting said optical unit laterally from said wheel and shiftable toward and away from said wheel; a screen disposed a predetermined distance from said optical unit; a mirror mounted on said wheel and facing laterally therefrom; a chart projector on said unit for projecting a chart on said screen; light source means on said unit for projecting light beams inwardly and forwardly and inwardly and rearwardly from said unit against said mirror; and reflecting means on said unit for receiving said beams when the latter are reflected from said wheel mirror and directing said beams onto said screen, images of said beams on said screen traveling in opposite directions when said unit is shifted toward and away from said wheel mirror, a given relationship between said images indicating a predetermined spacing of said unit from said wheel mirror, said chart projector having means for so locating and calibrating said chart as to cause the image of one of said beams when projected thereon with said unit so spaced, to indicate a particular alignment characteristic of said wheel.

5. In an apparatus for measuring an alignment characteristic of a dirigible wheel, the combination of: an optical unit; means for mounting said optical unit laterally from a wheel to be tested and shiftable laterally relative thereto; a middle mirror and two wing mirrors mounted on said wheel with the middle mirror approximately parallel with the plane of said wheel and the other two mirrors angled therefrom symmetrically relative to the axis of said wheel; a screen disposed a predetermined distance from said optical unit; a chart projector on said unit for projecting camber and caster charts on said screen; light source means on said unit for projecting light beams inwardly and forwardly and inwardly and rearwardly from said unit against said middle mirror when said wheel is turned straight ahead or against said wing mirrors when said wheel is cocked inwardly or outwardly; means on said unit for receiving said beams when the latter are reflected from one of the mirrors on said wheel and directing said beams onto said screen; and means for shifting said unit toward or away from said wheel, images of said beams on said screen traveling in opposite directions when said unit is so shifted, a given relationship between said images indicating a predetermined spacing of said unit from said mirror on said wheel, said chart projector having means for so locating and calibrating said chart as to cause the image of one of said beams when directed onto said screen after being reflected from said middle mirror and with said unit so spaced, to indicate on said camber chart the camber of said wheel, the distance between the positions of said image on said caster chart when reflected from said wing mirrors being adapted to indicate the caster of said wheel.

6. In a device for measuring an alignment characteristic common to a pair of right and left connected dirigible wheels, the combination of: a pair of mirrors, one of said mirrors being mounted on each of said wheels so as to face laterally from said wheel; screen means; means providing chart means on said screen means; a pair of right and left optical units each of which includes means for projecting a cross-hair beam of light, each unit being disposed laterally from one of said mirrors, directing its beam against said mirror, and deflecting the reflected beam onto said screen means said units thus producing two cross-hair images on said screen means which are visible from a single point; means for shifting said units toward and away from said mirrors; and optical means on said units projecting locator beams on said mirrors and the reflections thereof on said screen, said means being responsive to the shifting of each of said optical units to and from an adjacent one of said mirrors to indicate when the proper spacing of said optical units from said mirrors is obtained, the relative positions of said cross-hair images on said screen means when said optical units are so positioned indicating on said chart means an alignment characteristic of said wheels.

7. An apparatus for measuring an alignment characteristic of one of a pair of dirigible wheels, which comprises: a mirror mounted on said wheel and facing laterally therefrom; a base mounted for rectilinear movement laterally towards and away from said mirror in a direction having a fixed orientation relative to the line passing through the centers of said wheels; a screen spaced from said base and disposed approximately parallel with said direction; means providing a chart on said screen; and optical means on said base for projecting a pair of converging beams of light against said mirror, each beam having a fixed orientation relative to said direction, and causing reflections of said beams to fall upon said screen whereby a cross-hair image is produced by one beam and a locator image is produced by the other beam, said chart embodying calibrations so that when said base is shifted in said direction to bring about a predetermined relation on said screen between said cross-hair and locator images, a proper spaced relation will have been accomplished between said base and said wheel mirror, as a result of which, with the wheel turned in a predetermined angular relation with said line, the location of said cross-hair image with respect to said calibrations will indicate quantitatively the amount of said alignment characteristic.

8. An apparatus for measuring an alignment characteristic of one of a pair of dirigible wheels, which comprises: a mirror mounted on said wheel and facing laterally therefrom; a base mounted for rectilinear movement laterally towards and away from said mirror in a direction having a fixed orientation relative to the line passing through the centers of said wheels; a screen spaced from said base and disposed approximately parallel with said direction; means on said base for projecting a chart on said screen along an axis having a fixed orientation relative to said direction; and optical means on said base for projecting a pair of converging beams of light against said mirror, each beam having a fixed orientation relative to said direction, and causing reflections of said beams to fall upon said screen whereby a cross-hair image is produced by one beam and a locator image is produced by the other beam, said chart embodying a vertical reference line and horizontal calibrations so that when said base is shifted in said direction to bring about a predetermined relation on said screen between said cross-hair and locator images, a proper spaced relation will have been accomplished between said base and said wheel mirror, as a result of which, with the wheel turned to bring said cross-hair image on said vertical reference line, the location of said cross-hair image with respect to said calibrations will indicate quantitatively the amount of said alignment characteristic.

9. An apparatus for measuring an alignment characteristic of one of a pair of dirigible wheels, which comprises: a mirror fastened on said wheel and facing laterally therefrom; a projection base mounted for rectilinear movement laterally towards and away from said mirror in a direction having a fixed orientation relative to the line passing through the centers of said wheels; a screen spaced from said base and disposed approximately parallel with said direction; means on said base for projecting a chart on said screen along an axis having a fixed orientation relative to said direction; means on said base to project a beam of light which passes through the vertical plane containing said axis and impinges against said wheel mirror, said beam having a fixed orientation relative to said direction and inclining towards said wheel center line; and a mirror on said base positioned out of the path of said beam, but in the path of the reflection of said beam from said wheel mirror and inclined relative to said path, so as to direct said reflected beam onto said screen to form a cross-hair image, said base mirror also being out of the path of rays of light employed in projecting said chart, said chart embodying calibrations so that when said base is shifted in said direction into a given spaced relation with said wheel mirror, and the wheel is placed in a predetermined angular relation with said line, the location of said cross-hair image on said screen, with reference to said calibrations, indicates quantitatively the amount of said alignment characteristic.

10. A combination as in claim 9 in which means is provided on said base for projecting a locator beam against said wheel mirror along a path having a fixed orientation relative to said direction and in converging relation with the aforesaid beam; and a mirror on said base disposed out of the path of the aforesaid beam and of said chart projection rays but in the path of the reflection of said locator beam from said wheel mirror and inclined to direct said reflected locator beam onto said screen to produce a locator image, the converging relation of said cross-hair and locator beams causing the images thereof on said screen to change their relation on said screen with movement of said base as aforesaid, said chart embodying calibrations so that when said base is shifted in said direction to bring said cross-hair and locator images on said screen into a predetermined relation, this will indicate that said base has the proper spaced relation with said wheel mirror, and when the wheel is now placed in a predetermined angular relation with said line of wheel centers, the location of said cross-hair image with reference to said chart calibrations will indicate quantitatively the amount of said alignment characteristic.

11. A combination as in claim 10 in which said locator beam is disposed at a different horizontal level than said cross-hair beam and said chart projection rays.

12. A combination as in claim 11 in which said cross-hair beam and said chart projection axis lie in the same horizontal plane.

13. A combination as in claim 9 in which said beam intercepts said axis on its way towards said wheel mirror.

14. A combination as in claim 9 in which said beam intercepts said axis on its way towards said wheel mirror and in which said chart axis and said beam lie in the same horizontal plane.

TRACY CARRIGAN.
HERBERT G. HOLMES.
CLYDE A. SHOEMAKER.

REFERENCES CITED

The following references are of record in the file of this patent:

UNITED STATES PATENTS

| Number | Name | Date |
|---|---|---|
| 2,410,339 | Creagmile | Oct. 29, 1946 |